US012505688B2

(12) United States Patent
Jha et al.

(10) Patent No.: US 12,505,688 B2
(45) Date of Patent: Dec. 23, 2025

(54) CHARACTER-BASED REPRESENTATION LEARNING FOR INFORMATION EXTRACTION USING ARTIFICIAL INTELLIGENCE TECHNIQUES

(71) Applicant: Dell Products L.P., Round Rock, TX (US)

(72) Inventors: Saurabh Jha, Bangalore (IN); Atul Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 478 days.

(21) Appl. No.: 17/740,683

(22) Filed: May 10, 2022

(65) Prior Publication Data

US 2023/0368553 A1 Nov. 16, 2023

(51) Int. Cl.
*G06V 30/19* (2022.01)
*G06F 17/14* (2006.01)
(Continued)

(52) U.S. Cl.
CPC ........ *G06V 30/19147* (2022.01); *G06F 17/14* (2013.01); *G06V 10/454* (2022.01); *G06V 30/41* (2022.01)

(58) Field of Classification Search
None
See application file for complete search history.

(56) References Cited

U.S. PATENT DOCUMENTS 9,378,200 B1   6/2016   Cohen et al.
9,672,279 B1   6/2017   Cohen et al.
(Continued)

FOREIGN PATENT DOCUMENTS

CN    113642293 A   *   11/2021           G06F 17/156

OTHER PUBLICATIONS

W. Xue, Q. Li and Q. Xue, "Text Detection and Recognition for Images of Medical Laboratory Reports With a Deep Learning Approach," in IEEE Access, vol. 8, pp. 407-416, 2020, doi: 10.1109/ACCESS.2019.2961964 (Year: 2020).*

(Continued)

*Primary Examiner* — Amandeep Saini
*Assistant Examiner* — Caroline Tabancay Duffy
(74) *Attorney, Agent, or Firm* — Ryan, Mason & Lewis, LLP

(57) ABSTRACT

Methods, apparatus, and processor-readable storage media for character-based representation learning for information extraction using artificial intelligence techniques are provided herein. An example computer-implemented method includes identifying, from unstructured documents, words and corresponding document position information using artificial intelligence-based text extraction techniques; generating an intermediate output by implementing at least one character embedding with respect to the unstructured documents using at least one artificial intelligence-based encoder; determining structure-related information for at least a portion of the unstructured documents using one or more artificial intelligence-based graph-related techniques; generating a character-based representation of at least a portion of the unstructured documents using at least one artificial intelligence-based decoder; classifying one or more portions of the character-based representation using one or more artificial intelligence-based statistical modeling techniques; and performing one or more automated actions based on the classifying.

20 Claims, 10 Drawing Sheets

(51) Int. Cl.
*G06V 10/44* (2022.01)
*G06V 30/41* (2022.01)

(56) References Cited

U.S. PATENT DOCUMENTS

| | | | |
|---|---|---|---|
| 10,127,304 | B1 | 11/2018 | Cohen et al. |
| 10,235,452 | B1 | 3/2019 | Savir et al. |
| 10,803,399 | B1 | 10/2020 | Cohen et al. |
| 11,481,605 | B2 * | 10/2022 | Nguyen ................. G06V 10/82 |
| 2020/0334416 | A1 * | 10/2020 | Vianu ................. G06V 10/764 |
| 2021/0012102 | A1 * | 1/2021 | Cristescu .............. G06F 40/284 |
| 2021/0248367 | A1 * | 8/2021 | Gal ....................... G06V 10/454 |
| 2021/0374190 | A1 * | 12/2021 | Shepherd ................. G06N 3/08 |
| 2022/0319217 | A1 | 10/2022 | Paliwal |
| 2023/0005286 | A1 | 1/2023 | Yebes Torres |
| 2023/0075290 | A1 * | 3/2023 | Wåreus ................. G06F 21/577 |
| 2023/0368556 | A1 | 11/2023 | Jha |

OTHER PUBLICATIONS

R. Gal, S. Ardazi, R. Shilkrot, "Cardinal Graph Convolution Framework for Document Information Extraction," in ACM Digital Library, 2020, doi: 10.1145/3395027.3419584 (Year: 2020).*

Jang, B., Kim, M., Harerimana, G., Kang, S., & Kim, J. W. (2020). Bi-LSTM Model to Increase Accuracy in Text Classification: Combining Word2vec CNN and Attention Mechanism. Applied Sciences, 10(17), 5841—. https://doi.org/10.3390/app10175841 (Year: 2020).*

Wikipedia, Robotic process automation, https://en.wikipedia.org/w/index.php?title=Robotic_process_automation&oldid=1084045031, Apr. 22, 2022.

Wikipedia, ABBYY Fine Reader, https://en.wikipedia.org/w/index.php?title=ABBYY_FineReader&oldid=1082321823, Apr. 12, 2022.

Wikipedia, Alteryx, https://en.wikipedia.org/w/index.php?title=Alteryx&oldid=1078943432, Mar. 24, 2022.

Wikipedia, Microsoft Azure, https://en.wikipedia.org/w/index.php?title=Microsoft_Azure&oldid=1085299553, Apr. 29, 2022.

Entrinsik.com, https://entrinsik.com/informer/, May 5, 2022.

Wikipedia, Long short-term memory, https://en.wikipedia.org/w/index.php?title=Long_short-term_memory&oldid=1085879235, May 2, 2022.

Wikipedia, Autoregressive integrated moving average, https://en.wikipedia.org/w/index.php?title=Autoregressive_integrated_moving_average&oldid=1086361303, May 5, 2022.

Nishida, K., Exploratory.io, An Introduction to Time Series Forecasting with Prophet in Exploratory, Apr. 12, 2017.

Rigby, J., TowardsDataScience.com, AddressNet: How to build a robust street address parser using a Recurrent Neural Network, Dec. 5, 2018.

Github.com, Libpostal, https://github.com/openvenues/libpostal, May 5, 2022.

* cited by examiner

CHARACTER-BASED REPRESENTATION LEARNING FOR INFORMATION EXTRACTION USING ARTIFICIAL INTELLIGENCE TECHNIQUES

FIELD

The field relates generally to information processing systems, and more particularly to techniques for processing documents using such systems.

BACKGROUND

There are instances wherein users and/or enterprises wish to extract specific information from unstructured documents with varied intrinsic layout information (e.g., scanned documents, text-based portable document format (PDF) documents, etc.). However, conventional document processing techniques struggle to extract unstructured document content in the presence of layout variability, and typically rely on efforts that are error-prone and resource-intensive.

SUMMARY

Illustrative embodiments of the disclosure provide techniques for character-based representation learning for information extraction using artificial intelligence techniques. An exemplary computer-implemented method includes identifying, from at least one set of unstructured documents, one or more words and corresponding document position information by processing at least a portion of the at least one set of unstructured documents using one or more artificial intelligence-based text extraction techniques. The method also includes generating an intermediate output by implementing at least one character embedding with respect to the at least one set of unstructured documents by processing at least a portion of the one or more identified words and corresponding document position information using at least one artificial intelligence-based encoder, as well as determining structure-related information for at least a portion of the at least one set of unstructured documents by processing the intermediate output using one or more artificial intelligence-based graph-related techniques. Further, the method includes generating a character-based representation of at least a portion of the at least one set of unstructured documents by processing at least a portion of the intermediate output in connection with the determined structure-related information using at least one artificial intelligence-based decoder. Additionally, the method includes classifying one or more portions of the character-based representation using one or more artificial intelligence-based statistical modeling techniques, and performing one or more automated actions based at least in part on the classifying of the one or more portions of the character-based representation.

Illustrative embodiments can provide significant advantages relative to conventional document processing techniques. For example, problems associated with error-prone and resource-intensive techniques are overcome in one or more embodiments through implementing automated character-based representation learning for information extraction using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
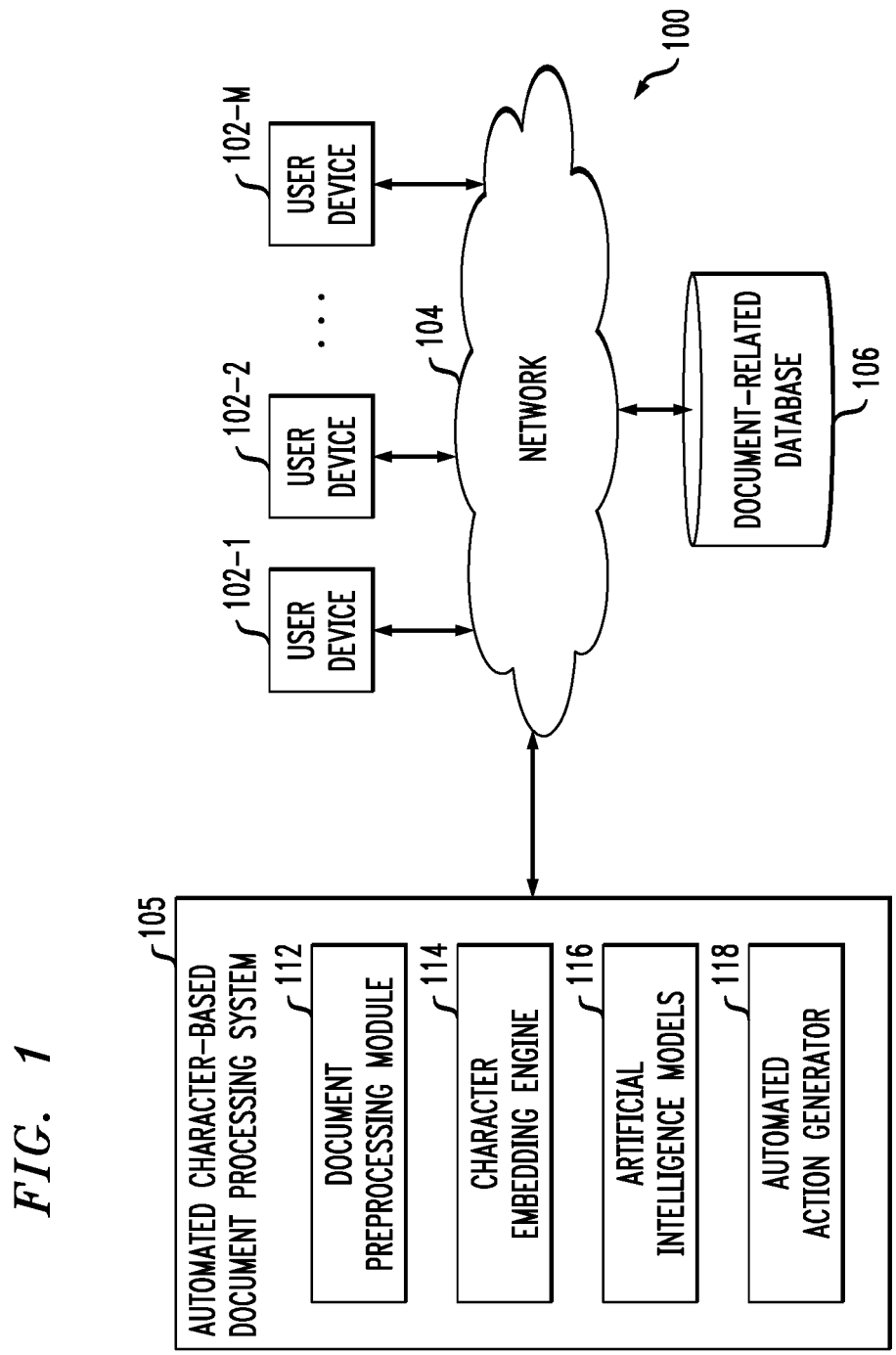
FIG. 1 shows an information processing system configured for character-based representation learning for information extraction using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated character-based document processing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated character-based document processing system 105 can have an associated document-related database 106 configured to store data pertaining to unstructured documents, which comprise, for example, text data, image data, layout information, language data, etc.

The document-related database 106 in the present embodiment is implemented using one or more storage systems associated with automated character-based document processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated character-based document processing system 105 are one or more input-output devices, which illustratively comprise keyboards, displays or other types of input-output devices in any combination. Such input-output devices can be used, for example, to support one or more user interfaces to automated character-based document processing system 105, as well as to support communication between automated character-based document processing system 105 and other related systems and devices not explicitly shown.

Additionally, automated character-based document processing system 105 in the FIG. 1 embodiment is assumed to be implemented using at least one processing device. Each such processing device generally comprises at least one processor and an associated memory, and implements one or more functional modules for controlling certain features of automated character-based document processing system 105.

More particularly, automated character-based document processing system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated character-based document processing system 105 to communicate over the network 104 with the user devices 102, and illustratively comprises one or more conventional transceivers.

The automated character-based document processing system 105 further comprises document preprocessing module 112, character embedding engine 114, artificial intelligence models 116, and automated action generator 118.

It is to be appreciated that this particular arrangement of elements 112, 114, 116, and 118 illustrated in the automated character-based document processing system 105 of the FIG. 1 embodiment is presented by way of example only, and alternative arrangements can be used in other embodiments. For example, the functionality associated with elements 112, 114, 116, and 118 in other embodiments can be combined into a single module, or separated across a larger number of modules. As another example, multiple distinct processors can be used to implement different ones of elements 112, 114, 116, and 118 or portions thereof.

At least portions of elements 112, 114, 116, and 118 may be implemented at least in part in the form of software that is stored in memory and executed by a processor.

It is to be understood that the particular set of elements shown in FIG. 1 for character-based representation learning for information extraction using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated character-based document processing system 105 and document-related database 106, can be on and/or part of the same processing platform.

An exemplary process utilizing elements 112, 114, 116, and 118 of an example automated character-based document processing system 105 in computer network 100 will be described in more detail with reference to the flow diagram of FIG. 9.

Accordingly, at least one embodiment includes character-based representation learning for information extraction using artificial intelligence techniques. Such an embodiment includes focusing on a set of fields, expected within documents, wherein such fields have values that carry information on the sensitivity, origin, destination, purpose and/or content of the information (e.g., for purchase orders (POs), fields such as PO number, quote number, ship-to address, bill-to address, payment term, customer name, etc.). Such an embodiment includes automatically extracting, using a deep learning approach, such field values from documents and integrating such extracted values into a solution for automatic document processing.

By way merely of illustration and example, consider a scenario wherein a user wishes to purchase products from an enterprise, and one or more PO documents must be sent with information that identifies the list of products that the user wishes to purchase, the delivering address(es), contact information, quote number, and one or more other related details. It is also possible that such (digital) documents can have layouts that vary across users and/or between groups or departments within the enterprise. Accordingly, and as further detailed herein, one or more embodiments include automatically identifying and extracting a set of fields from such types of unstructured documents to determine and/or classify relevant parts of the document content.

In such an embodiment, a set of unstructured documents is obtained and labeled to be used as training and validation datasets. In at least one embodiment, at least a portion of such data is preprocessed, wherein such data are represented with one or more labels and position information. As further described herein, such preprocessed data can then be processed using a Fourier dilated graph encoding layer, at least one decoder, and an inference pipeline for information extraction. Accordingly, such an embodiment includes character-based representation learning, with multi-lingual support, to extract information from documents with varied layouts.

In one or more embodiments, preprocessing of document content can include generating a list of words and the coordinates of corresponding bounding boxes. Such a task can be executed, for example, using optical character recognition (OCR) techniques if the document contains images (e.g., scanned images). Additionally or alternatively, a document in digital form (e.g., in PDF), may already contain the required information in the desired format, and in such an instance, one or more programming libraries and/or frameworks (e.g., PDFplumber for the Python programming language) can be implemented to support the extraction of words and/or graphical elements from such documents.

In addition to input data preprocessing (e.g., of documents containing multiple languages), one or more embodiments include intelligently determining and/or identifying one or more node connections as well as increasing the receptive field of one or more neurons. As used herein, with respect to discussion of graph neural networks, each word of a document is considered a node. Additionally, as detailed herein in connection with one or more embodiments, a convolution neural layer includes individual units referred to as neurons. Further, in such an embodiment, a receptive field (RF) is defined as the size of the region in the input that produces the feature. As such, a receptive field can refer to a measure of association of an output feature (of any layer) to the input region (patch) while training a convolution neural network.

As further detailed herein, at least one embodiment also includes processing information flow between tokens using frequency domain techniques, implementing half precision and single precision techniques, as well as processing unstructured data (e.g., sequence swapping, special characters, unwanted words, etc.) using clustering techniques, outlier detection techniques, and/or two-dimensional (2D) sorting techniques. As used herein, tokens refer to building blocks of natural language, and tokenization refers to a method of separating a piece of text into smaller units (i.e., tokens). In one or more embodiments, tokens can include words, characters, or sub-words. Accordingly, in such an embodiment, tokenization can be classified into three types: word tokenization, character tokenization, and sub-word (e.g., n-gram characters) tokenization.

In one or more embodiments, subsequent to data gathering and labeling steps, as well as data preprocessing steps, the resulting data can be processed using at least one encoding layer, implementing text and visual embedding techniques. Additionally, as further detailed herein, such embodiments include implementing graph learning techniques in connection with at least one graph convolution layer, as well as implementing at least one decoder in connection with deep learning model training. Further, such an embodiment can also include implementing an inference and information extraction pipeline and carrying out one or more memory optimization techniques.

With respect to data gathering and labeling, one or more embodiments include annotating at least a portion of the data manually and/or automatically using one or more annotations tool. Additionally, at least one embodiment includes obtaining or gathering such data using one or more document processing techniques that match documents that have been previously processed with corresponding processed information. In such an embodiment, a set of documents for which field information is known can be referred to as annotated documents.

With respect to annotation, one or more embodiments can include, as noted above, using automated annotation tools. For example, to annotate an individual field (e.g., of a digital document), annotating can include dragging and/or drawing a box around that field, then using one or more underlying Python libraries to fetch the text under that box, extract the text, and populate that field.

Figure 2:
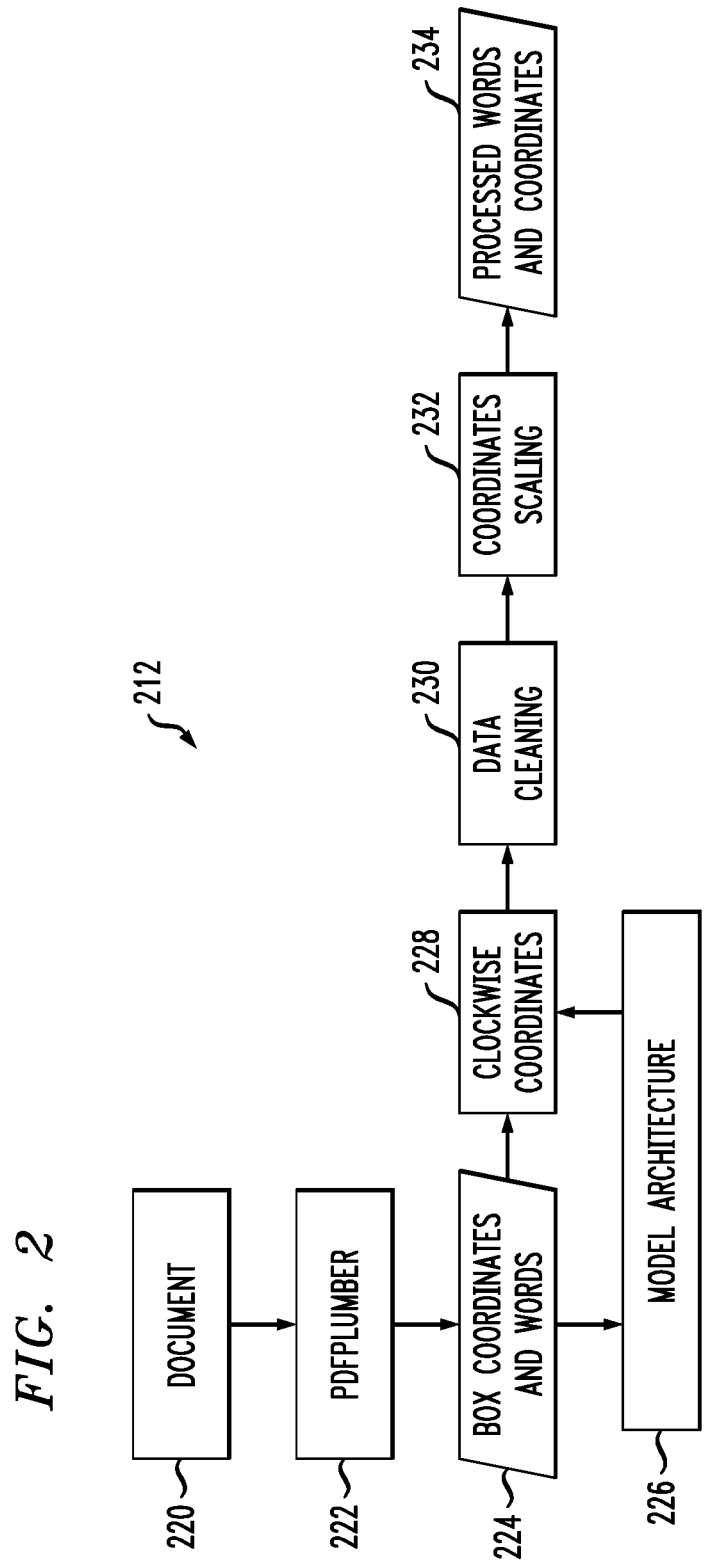
FIG. 2 shows an example PDF preprocessing workflow in an illustrative embodiment.

FIG. 2 shows an example PDF preprocessing workflow, such as carried out by and/or within document preprocessing module 212, in an illustrative embodiment. Using a Python library such as PDFplumber 222 (though it should be noted that one or more other extraction programs can be used), such an embodiment includes extracting box coordinates (e.g., surrounding boundaries) and words 224 from a text-based document 220. For example, such an embodiment can include extracting words and corresponding box coordinates and/or diagonal coordinates. Using such coordinates, at least one embodiment includes calculating the other two clockwise coordinates 228 of the rectangle in a clockwise direction by using height and width values of the word(s) in connection with model architecture 226 (as further detailed herein). As also depicted in FIG. 2, data cleaning 230 can include filtering-out one or more unnecessary words from the extracted words. Additionally, coordinates scaling 232 (e.g., using the image width and height values for normalizing the coordinates) can be performed, generating processed words and coordinates 234.

Accordingly, with respect to a text-based document, one or more embodiments includes using Python libraries to extract words and surrounding boundaries. Such an embodiment includes providing a given word and its diagonal coordinates. With these coordinates, such an embodiment can include calculating the other two coordinates of the given rectangle in a clockwise direction by using height and width of the word (e.g., in one or more embodiments, a Python module is used to determine the image width and height). By way of example, such an embodiment can include using image width and height for normalizing the coordinates (e.g., wherein the image is a purchase order document). Also, to train one or more models utilized by at least one embodiment, multiple types of information are used. For example, such information can include documents converted to at least one image format (e.g., jpeg format) and/or at least one entity file created to contain only labeled content.

Figure 3:
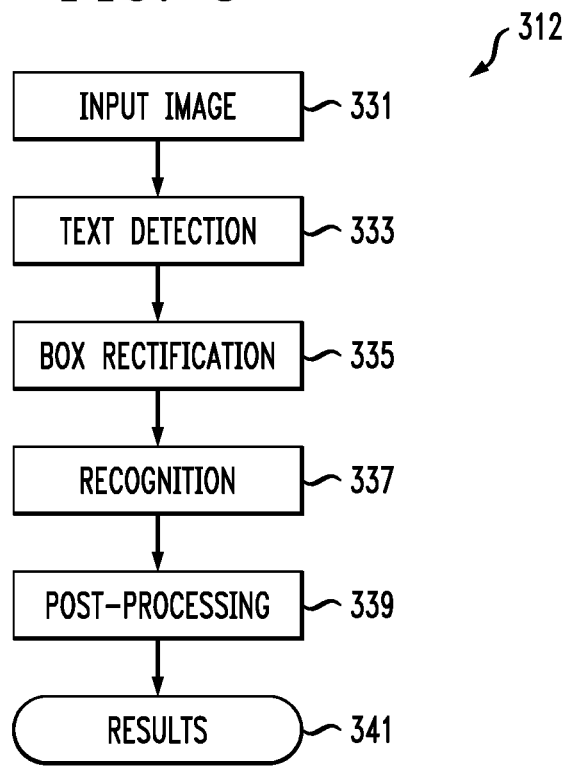
FIG. 3 shows an example auto-correction workflow in an illustrative embodiment.

FIG. 3 shows an example auto-correction workflow, such as carried out by and/or within document preprocessing module 312, in an illustrative embodiment. As depicted in FIG. 3, using an input image 331, text detection is carried out in step 333, wherein a trained OCR system is used in connection with OpenCV techniques to extract information from input image 331. An example scenario could include, for instance, an image that is inverted, rotated, and/or of poor quality. In step 335, box rectification is carried out, which includes using detected box coordinates to change the height of words, which are not in-line, to make the words in a same parallel line to recognize the text. In step 337, recognition is carried out by identifying and/or recognizing text out of each box using at least one Python library. Additionally, in step 339, post-processing is carried out and results 341 are generated. Post-processing can be carried out in instances, for example, which involve combined words extracted by OCR. In such an embodiment, an algorithm is implemented to resolve the issue, which converts a single rectangle surrounded by multiple words into multiple rectangles surrounded by each word. Additionally processing in such an embodiment can include the same and/or similar steps as performed in connection with text-based documents (e.g., such as detailed in connection with FIG. 2).

Figure 4:
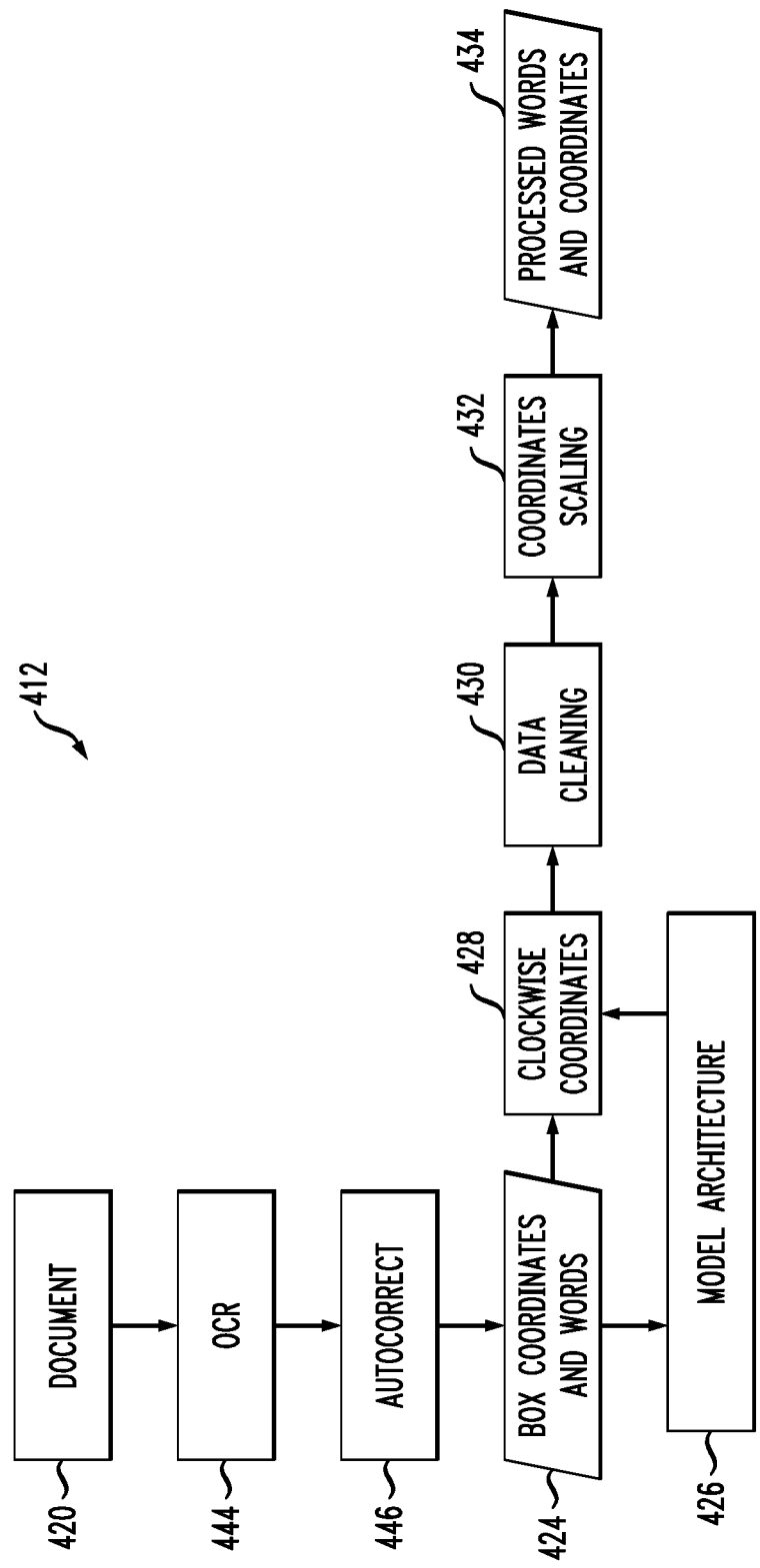
FIG. 4 shows an example image data extraction preprocessing workflow in an illustrative embodiment.

FIG. 4 shows an example image data extraction preprocessing workflow, such as carried out by and/or within document preprocessing module 412, in an illustrative embodiment. Also, the workflow depicted in FIG. 4 shares similarities with the workflow depicted in FIG. 2, specifically with respect to elements 220 and 420, elements 224 and 424, elements 226 and 426, elements 228 and 428, elements 230 and 430, elements 232 and 432, and elements 234 and 434. Additionally, FIG. 4 depicts OCR system 444 and autocorrect in step 446, wherein a word is extracted via OCR system 444 and one or more corresponding boxes are auto-corrected via step 446 (e.g., as detailed in connection with FIG. 3). Subsequent to step 446, each word is received and/or obtained along with corresponding box coordinates 424.

Figure 5:
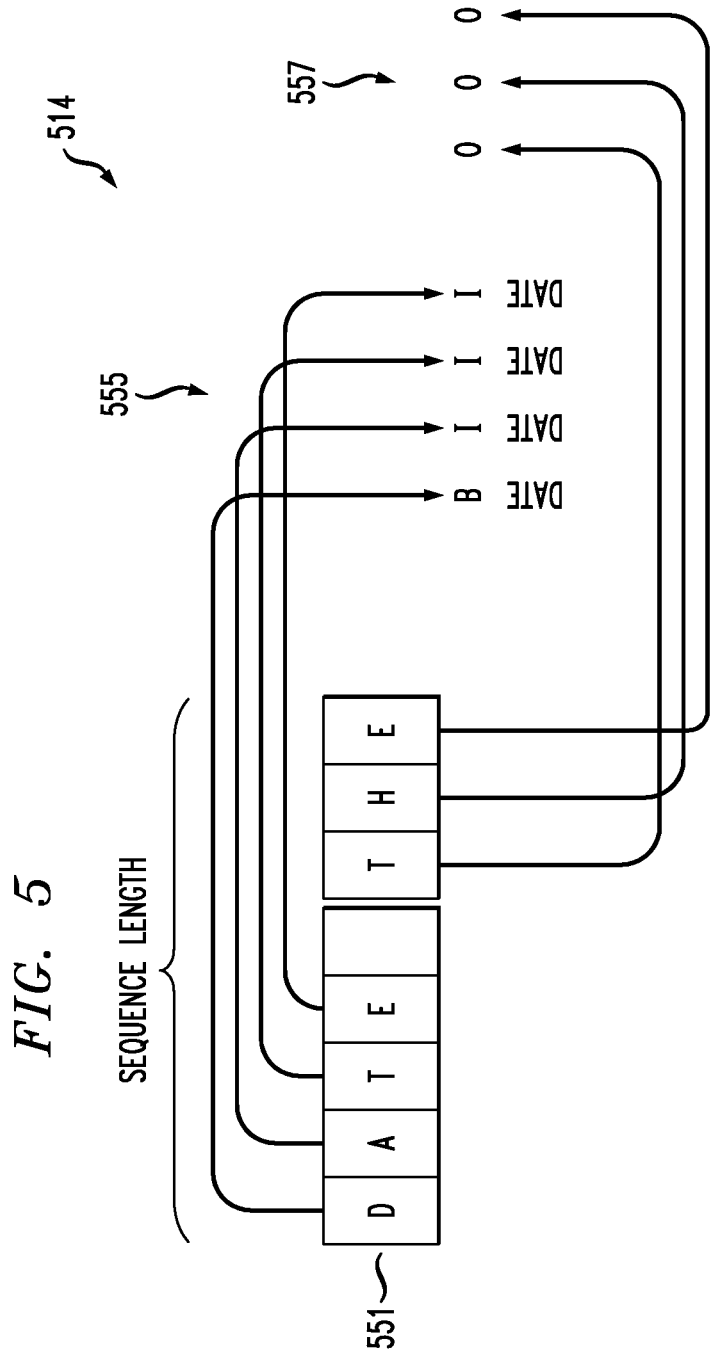
FIG. 5 shows example of character embedding in an illustrative embodiment.

FIG. 5 shows example of character embedding, such as carried out by and/or within character embedding engine 514, in an illustrative embodiment. As depicted in FIG. 5, in one or more embodiments, a beginning, inside, outside (BIO) format can be used to tag tokens for computational linguistics (e.g., named-entity recognition). As used herein and in connection with token sequence 551, a B-prefix before a tag indicates that the tag is the beginning of a token, while an I-prefix before a tag indicates that the tag is within a token (such as depicted via step 555). Also, a B-tag is used only when a tag is followed by a tag of the same type without an O token between them, and tokens with an O tag do not belong to any entity or token (such as depicted via step 557).

The following example, in connection with the techniques depicted in FIG. 5, illustrate a BIO tagged sentence. For instance, consider "payment term—net 30 days," wherein "net 30 days" is annotated as a payment_term before training the corresponding model. Applying the BIO format to such as sequence of text annotated as a payment_term can result in the following:

n B-payment_term
e I-payment_term
t I-payment_term
3 B-payment_term
0 I-payment_term
d B-payment_term
a I-payment_term
y I-payment_term
s I-payment_term.

Additionally, and as noted herein, one or more embodiments include encompassing multiple languages. For example, instead of embedding words, such an embodiment can include using characters such that multilingual users can be presented with native and/or preferred characters. Further, character models can have a smaller vocabulary than many languages, which can render using characters computationally efficient.

Figure 6:
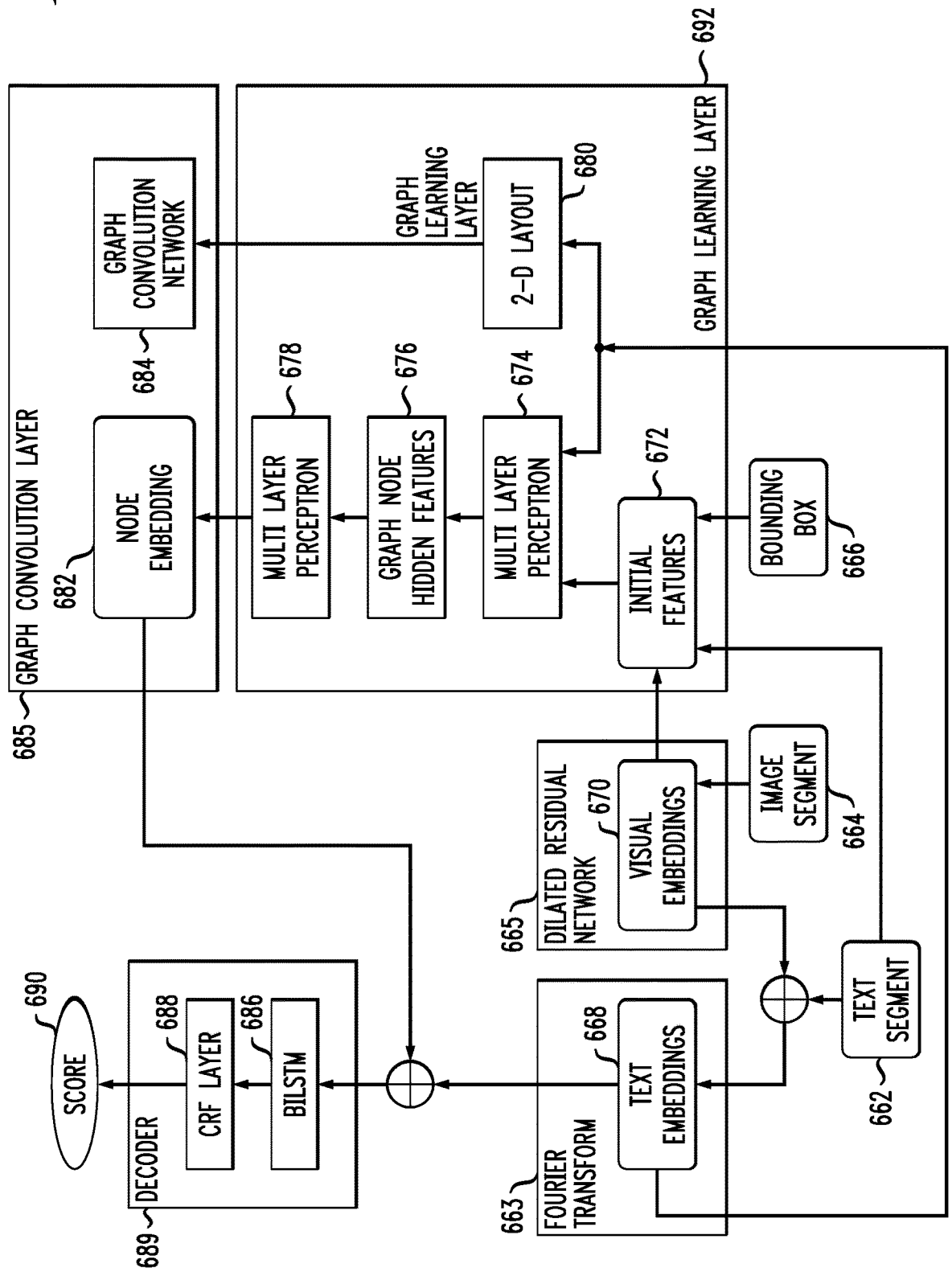
FIG. 6 shows example architecture of an illustrative embodiment.

FIG. 6 shows example architecture of at least a portion of artificial intelligence models 616, in an illustrative embodiment. As detailed above, in one or more embodiments, a preprocessing and/or annotation process generates two different files: one file which contains text and bounding box information pertaining to a document, and one file which contains an image format of the document. Accordingly, FIG. 6 depicts providing such a text segment 662 to a Fourier transform 663 to learn one or more text embeddings 668. Also, FIG. 6 depicts providing an image segment 664 to a dilated residual network 665 which determines one or more visual embeddings 670. In at least one embodiment, the text embeddings 668 and the visual embeddings 670 can be viewed as node embeddings wherein each word in the given document has been considered as a node.

As also depicted in FIG. 6, a graph learning layer 692 uses the text embeddings 668 and the visual embeddings 670 to learn and/or determine an adjacency matrix, which represents how nodes are connected to each other. In carrying out this task, graph learning layer 692 utilizes bounding box information 666 in conjunction with the visual embeddings 670 to generate and/or determine initial features 672, which are then processed with the text embeddings 668 using a first multi-layer perceptron 674 to generate and/or determine graph node hidden features 676. The graph node hidden features 676 are then processed by a second multi-layer perceptron 678 (e.g., in one or more embodiments, multi-layer perceptron 674 and multi-layer perceptron 678 can be the same multi-layer perceptron) to generate and/or determine one or more node embeddings 682. As also depicted in FIG. 6, text embeddings 668 are also processed by graph learning layer 692 to generate and/or determine a 2D layout (of the document) 680, which is then provided to and/or processed by a graph convolution network 684 (within graph convolution layer 685).

Using the graph convolution layer 685, messages are exchanged between nodes and richer node embeddings 682 are created with 2D layout information. Then, such node embeddings 682 are concatenated with visual embedding information (derived from visual embeddings 670) and text embedding information (derived from text embeddings 668), and processed by a decoder 689, which includes a bidirectional long short-term memory (BiLSTM) layer 686 and a conditional random field (CRF) layer 688, wherein each sequence is tagged with one or more appropriate labels and a score 690 is generated and associated therewith.

As detailed herein, one or more embodiments include implementing at least one encoder layer in connection with text and visual embedding techniques. With respect to visual embedding, learning about the embedding of image segments that contain words from digital documents includes capturing surrounding features of each input pixel. Accordingly, at least one embodiment includes increasing the receptive fields of neurons without increasing the number of variables that are needed for learning. The receptive field can be increased in one or more ways, such as, for example, using one or more convolution layers with at least one dilation rate. By way of illustration, such an embodiment can include using a type of filter wherein a blank pixel is positioned between each pair of pixels. Also, in connection with use cases dealing with text, wherein font, size, and/or background can play a significant role, such techniques aid the model by facilitating a broader view of the input image segment.

By retaining the spatial information in the image segment, one or more embodiments include enabling capturing of background information, font size, type information, and/or any lines in the background that are relevant to the graph layer:

$$IE=CNN(s_i;\theta_{cnn}),$$

wherein $s_i$ denotes the vector of the input image, segment IE represents the output of the CNN for the $i^{th}$ image segment $s_i$, and $\theta_{cnn}$ represents the CNN parameters.

Figure 7:
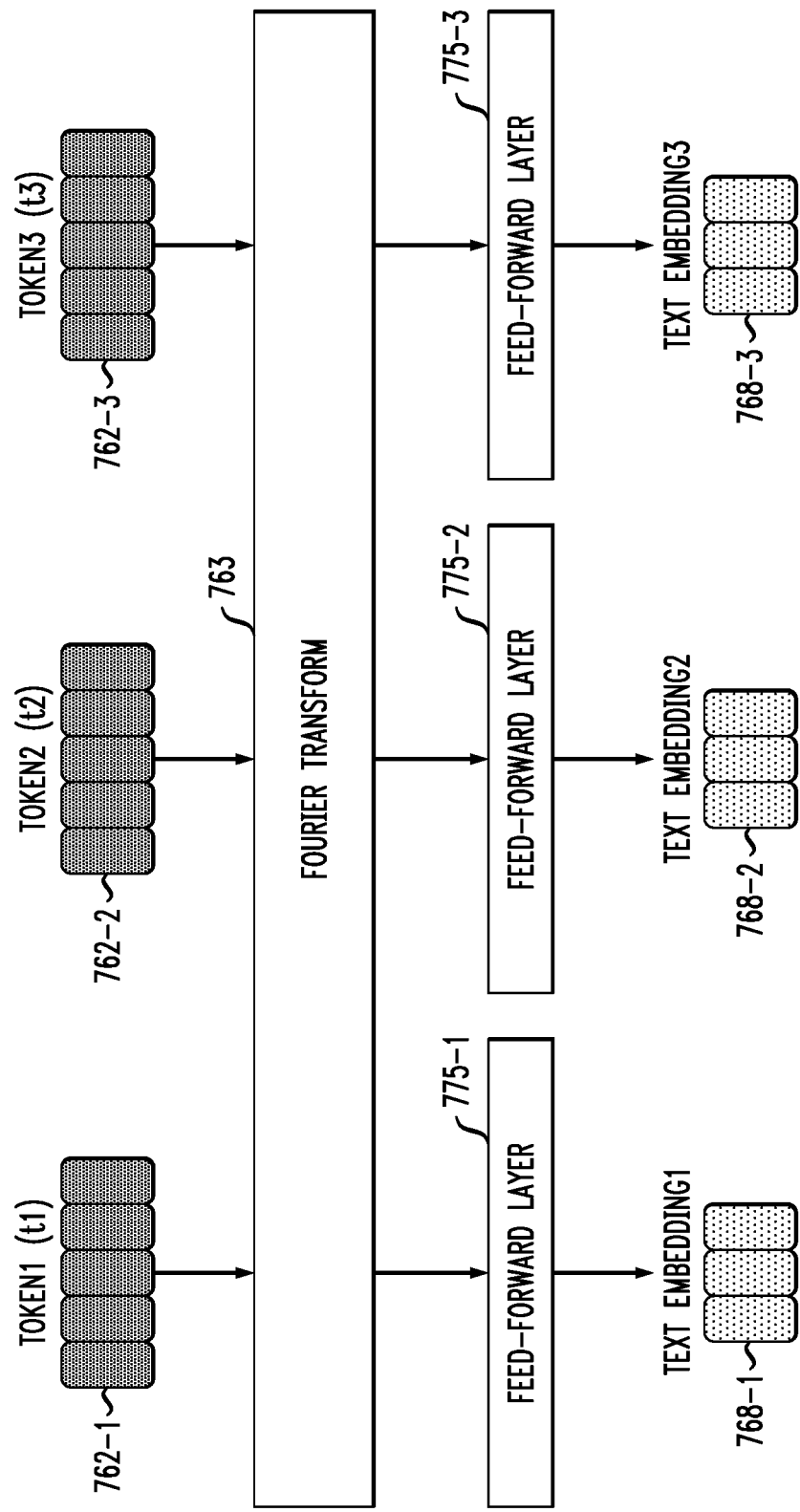
FIG. 7 shows an example implementation of textual embedding in an illustrative embodiment.

FIG. 7 shows an example implementation of text embeddings in an illustrative embodiment. As depicted in FIG. 7, for example, one or more embodiments include learning, using Fourier transform 763, text embeddings of a text segment, also referred to in this context as a token $t_k$, by summation of all other (relevant) tokens (e.g., tokens 762-1, 762-2, and 762-3) which are represented in terms of sine and cosine. The output of Fourier transform 763 represents the frequency of tokens out of all the tokens, which are then processed using individual feed-forward layers (e.g., 775-1, 775-2, and 775-3) for each frequency to generate text embeddings (e.g., 768-1, 768-2, and 768-3).

To learn the textual embedding of a document, one or more embodiments include utilizing architecture similar to transformer architecture. Specifically, such an embodiment includes using at least one Fourier transform in connection with facilitating a flow of information by combining tokens in the frequency domain (instead, for example, of learning how the information flows). Accordingly, such an embodiment can include applying a Fourier transform two times: once in the hidden dimension and once in the time dimension. One or more embodiments include learning the text embedding of a token $t_k$ by the summation of all other tokens which are represented in terms of sine and cosine. The output of this layer represents the frequency of tokens out of all of the tokens, and then individual feed-forward layers can be implemented for each frequency. In such a setup, there are no parameters to learn apart from the feed-forward layer, and as such, efficiency is improved on the given graphics processing unit (GPU). In connection with such an embodiment, a Fourier transform block can apply a 2D discrete Fourier transform (DFT) to its embedding input: one one-dimensional (1D) DFT along the sequence dimension and one 1D DFT along the hidden dimension(s).

Additionally, at least one embodiment includes implementing one or more 2D connection learning layers and one or more graph convolution layers. In such an embodiment, a graph convolution network is implemented to learn the 2D layout of one or more digital documents, as well as how each word is related to one or more other words in the document(s) and one or more hidden features in the layout. As used herein, hidden representations are part of feature learning and refer to machine-readable data representations learned from a neural network's hidden layers.

Before applying such a graph convolution network, nodes are to be connected in a 2D arrangement. Accordingly, at least one embodiment includes implementing a 2D connection learning layer as well as a graph convolution layer to carry out this connection task. By way merely of example, in such an embodiment, each word can be considered a node, and at the start, there are no connections between words. As a result, an adjacency matrix can be created and/or implemented to show how at least a portion of the nodes and empty connections relate to one another. Nodes can be represented by the first row and column in such a matrix, and connections between nodes can be represented by the value. In an example embodiment, a higher connection value between two nodes indicates that the nodes are more related to each other (than nodes with lower connection values), and nodes with zero values can be filtered out from the network. As such, one or more embodiments include creating and/or implementing a single-layer (e.g., 2D connection learning layer) neural network to learn the two-dimensional connection between nodes, illustratively in accordance with the following equation:

$$A_{ij}=\text{softmax}(e_{ij}); i=1,\ldots,N j=1,\ldots N, \text{ and}$$
$$e_{ij}=\text{Relu}(W_i^T|v_i-v_j|)),$$

wherein A represents the 2d connection matrix, $A_{ij}$ represents at least one element of the 2D connection matrix, $e_{ij}$ represents a constant in connection with node i and node j (e.g., which can be used to learn 2D matrix A), $W_i^T$ represents a learnable weight vector, and $v_i$-$v_j$ represents the distance between node i and node j. Also, $v_i$ represents the projection of node i such that the distance between the two nodes in multidimension space can be calculated. Further, softmax and Relu (rectified linear unit) represent example activation functions (though it should be noted that one or more other activation functions can be used). In one or more embodiments, such equations are implemented as part of a single-layer neural network, such as noted above.

Additionally, one or more embodiments include determining one or more loss values using, for example, the following equation:

$$\text{Loss}=\Sigma_{i,j=1}^{n} \exp(|v_i-v_j|A_{ij})+\tau A,$$

wherein $\tau A$ (which is also being summed) represents a regularization parameter wherein r is a tradeoff parameter (e.g., a larger $\tau A$ value indicates more sparsity in matrix A), $v_i$-$v_j$ refers to the distance between node i and node j, and $v_i$ represents the projection of a node so that the distance between such nodes can be calculated in multi-dimension space. In this equation, the first item indicates that nodes $v_i$ and $v_j$ are separated (e.g., far apart) in higher dimensions, so the weight value $A_{ij}$ is smaller, and the exponential operation can magnify this effect. Similarly, nodes that are close to each other in higher dimensional space can have a stronger connection weight. This process can prevent graph convolution from aggregating information of noise nodes.

Using such an equation, a larger value of $v_i$-$v_j$ encourages a smaller value of $A_{ij}$, and vice versa. Additionally, once we have the connection(s) between nodes has been learned and/or determined, one or more embodiments include performing the graph convolution on one or more node-connection-node ($v_i$, $\alpha_{ij}$, $v_j$) triplets, wherein $\alpha_{ij}$ represents the edge between node i and node j.

In at least one embodiment, a graph convolution layer can be implemented in connection with the following equation:

$$V_i^{(n+1)}=\sigma(A_i h_i^n W^n),$$

wherein $A_i$ represents the $i^{th}$ row in 2D matrix A, node $V_i^{(n+1)}$ aggregates (via $\sigma$) the information from hidden features $h_i^n$ by message passing in the graph convolution network to obtain a richer (with respect to information) representation of the node. Additionally, in the above-noted equation, $W^n$ represents the learnable weights, and $h_i^n$ represents one or more hidden features. Initially, node features are created by combining textual and visual embeddings, and using a process of message passing between nodes, each node aggregates features from other nodes and updates their features.

As also detailed herein, one or more embodiments include implementing at least one decoder in connection with deep learning model training. After receiving encoder input, a union layer (i.e., a concatenation operation) will pack padded input sequences and fill padding at the end of one or more of such sequences. As used herein, padding is used to make all relevant vectors equal in length by adding zero to the end (of each such vector). Because one or more embodiments include embedding for individual characters, such an embodiment can also include merging all of the character encoding within a word which is done through packing. By way of example, in at least one embodiment, packed sequences can be regarded as a non-local document representation, and such an embodiment can include incorporating the node embedding of the output of the graph module into a packed sequence at each timestamp, which provides the layout and contextual information of documents as auxiliary information that aids in extraction.

In such an embodiment, at least a portion of this information can be fed into a BiLSTM layer, which creates a hidden state for each word. In one or more embodiments, a BiLSTM can use both past/left and future/right context information to form a final output. Additionally, in the final CRF layer, hidden states are treated as feature vectors of the words, from which the predicted tag sequence for the input is decoded. In at least one embodiment, a BiLSTM layer and a CRF layer are used together to form the final output sequence, wherein the CRF layer ensures that the output sequence is in the correct order.

Figure 8:
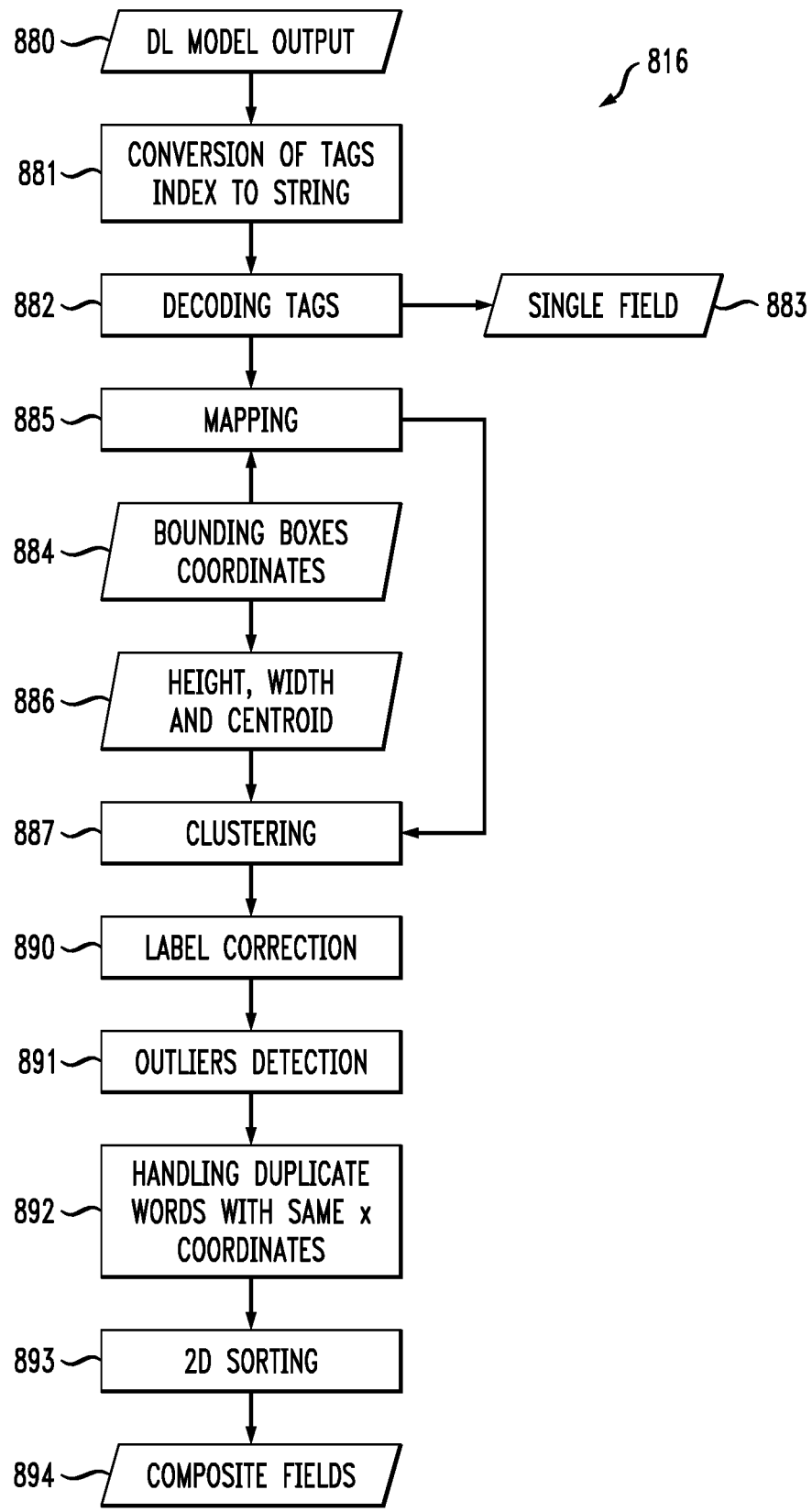
FIG. 8 shows an example automated inference workflow in an illustrative embodiment.

FIG. 8 shows an example automated inference workflow, such as carried out by artificial intelligence models 816, in an illustrative embodiment. Using a deep learning model output 880, the BIO index tags are converted in step 881 into strings that provide and/or produce decoding tags 882. The decoding tags 882 are then processed in step 885 with bounding box coordinates 884 to map given words with their coordinates. Any text labeled as a single field 883 type is passed directly as output (for example, PO number, date, etc.). In the case of text which is labeled as composite fields (e.g., shipping address, billing address, etc.), the height, width, and centroid of each word is calculated in step 886 and this height and width represents the horizontal and vertical distance of the text in the document. Subsequently, a clustering technique is applied in step 887 to identify whether words are labeled to correct the composite field or not. If some of the words are not tagged to the correct label, the label is corrected and/or updated using the clustering output in step 890.

Next, step 891 includes determining if any unnecessary words are tagged as labels using an outlier detection technique. Additionally, in one or more embodiments, all words which are labeled as composite fields need to be in the correct and/or same sequence as in the document. Accordingly, as depicted in FIG. 8, step 892 includes handling and/or fixing duplicate words with the same x coordinates, and step 893 includes implementing 2D. By way of example, in some instances, multiple words can have the same x coordinate for two different words in two different lines. As such, to perform sorting using x coordinates, these duplicate x coordinate words are handled and/or fixed by incrementing the x coordinate of one word by one if two words have the same x coordinate. Subsequently, this sorted text is saved as the final composite fields 894 output.

As also detailed herein, one or more embodiments include implementing an inference and information extraction pipeline. In such an embodiment, inferences are made based on the new document(s) received. When a determination is made regarding what a given document is using at least one classification model, such a determination will pass through programming libraries and/or frameworks (e.g. PDFplumber for the Python programming language) and/or one or more OCR techniques, which produce inputs including at least one bounding box and corresponding word information, as well as an image file of the document. After the input is processed, the model (e.g., the model depicted in FIG. 6, trained on annotated data) determines results (e.g., important and/or salient information from the document), and the output is passed through post-processed code which has capabilities of handling unstructuredness in output data (e.g., sequence swapping, text misplacement, special characters, unwanted words, etc.) to manage the model output through clustering, outlier detection, and/or 2D sorting before saving the output in a given format (e.g., JavaScript object notation (JSON), text, comma-separated values (CSV), etc.).

At least one embodiment can also include using half precision and single precision techniques. In using deep learning techniques (such as, for example, neural networks), the inputs, weights, and activations can be saved in 32 bit floats. Alternatively, one or more embodiments include reducing memory usage by performing one or more operations in half precision (e.g., 16 bits) and performing one or more other operations (e.g., weight updates such as 4×4 multiplications all at the same time) in single precision (e.g., 32 bits). In addition to saving and/or reducing memory usage, such an embodiment can include increasing batch size when using half precision, wherein a larger batch size can result in an increased number of parallel operations being performed, thereby reducing training time.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 9:
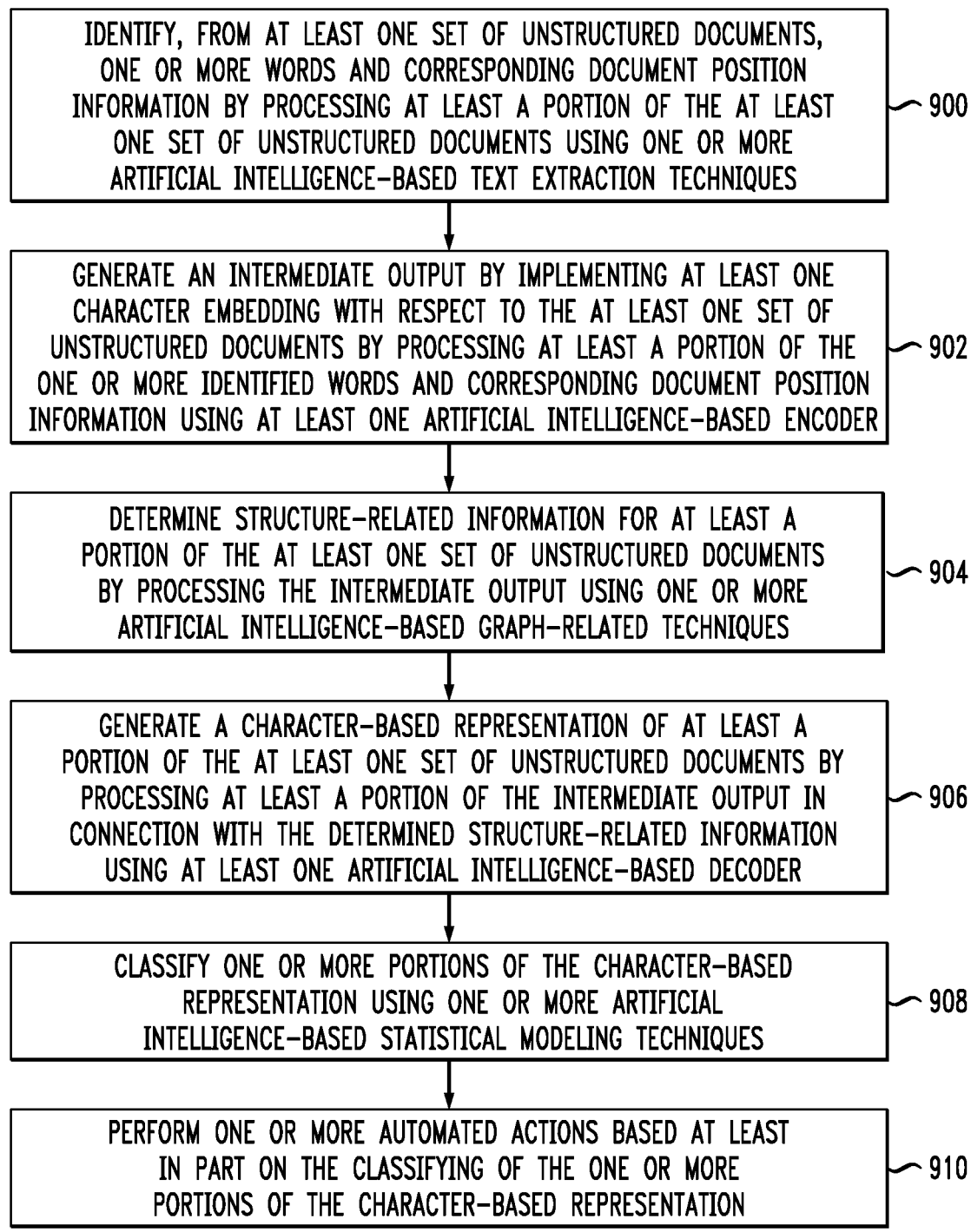
FIG. 9 is a flow diagram of a process for character-based representation learning for information extraction using artificial intelligence techniques in an illustrative embodiment.

FIG. 9 is a flow diagram of a process for character-based representation learning for information extraction using artificial intelligence techniques in an illustrative embodiment. It is to be understood that this particular process is only an example, and additional or alternative processes can be carried out in other embodiments.

In this embodiment, the process includes steps 900 through 910. These steps are assumed to be performed by the automated character-based document processing system 105 utilizing its elements 112, 114, 116, and 118.

Step 900 includes identifying, from at least one set of unstructured documents, one or more words and corresponding document position information by processing at least a portion of the at least one set of unstructured documents using one or more artificial intelligence-based text extraction techniques. In one or more embodiments, processing at least a portion of the at least one set of unstructured documents using one or more artificial intelligence-based text extraction techniques includes processing at least a portion of the at least one set of unstructured documents using at least one optical character recognition technique. Additionally or alternatively, identifying one or more words and corresponding document position information can include identifying one or more words and coordinates of corresponding bounding boxes within the at least one set of unstructured documents. Also, in one or more embodiments, the at least one set of unstructured documents can include one or more multi-lingual documents and/or one or more documents with varied layouts.

Further, at least one embodiment can include labeling at least a portion of the at least one set of unstructured documents, generating one or more training datasets based at least in part on the at least one labeled portion of the unstructured documents, and generating one or more validation datasets based at least in part on the at least one labeled portion of the unstructured documents.

Step 902 includes generating an intermediate output by implementing at least one character embedding with respect to the at least one set of unstructured documents by processing at least a portion of the one or more identified words and corresponding document position information using at least one artificial intelligence-based encoder. In at least one embodiment, implementing at least one character embedding includes implementing at least one textual embedding by processing at least a portion of the one or more identified words and corresponding document position information using at least one Fourier transform. Additionally or alternatively, implementing at least one character embedding can include implementing at least one visual embedding by processing at least a portion of the one or more identified words and corresponding document position information using one or more convolution layers with at least one dilation rate.

Step 904 includes determining structure-related information for at least a portion of the at least one set of unstructured documents by processing the intermediate output using one or more artificial intelligence-based graph-related techniques. In one or more embodiments, processing the intermediate output using one or more artificial intelligence-based graph-related techniques includes learning, using a graph convolution layer, a two-dimensional layout of at least a portion of the at least one set of unstructured documents, and learning, using the graph convolution layer, information pertaining to how one or more words within at least a portion of the at least one set of unstructured documents relate to one or more other words within at least a portion of the at least one set of unstructured documents. Additionally or alternatively, processing the intermediate output using one or more artificial intelligence-based graph-related techniques can include processing the intermediate output using one or more two-dimensional connection learning layers.

Step 906 includes generating a character-based representation of at least a portion of the at least one set of unstructured documents by processing at least a portion of the intermediate output in connection with the determined structure-related information using at least one artificial intelligence-based decoder. In at least one embodiment, generating a character-based representation includes modifying one or more sequences within the intermediate output using at least one union layer of the at least one artificial intelligence-based decoder.

Step 908 includes classifying one or more portions of the character-based representation using one or more artificial intelligence-based statistical modeling techniques. One or more embodiments can also include generating at least one hidden state for the one or more portions of the character-based representation by processing at least a portion of the character-based representation using at least one bidirectional long short-term memory model. Such an embodiment can also include processing at least a portion of the generated hidden states using at least one conditional random field layer.

Step 910 includes performing one or more automated actions based at least in part on the classifying of the one or more portions of the character-based representation. In at least one embodiment, performing one or more automated actions includes generating one or more inferences based at least in part on the classifying and extracting information from at least a portion of the at least one set of unstructured documents based at least in part on the one or more inferences.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement character-based representation learning for information extraction using artificial intelligence techniques. These and other embodiments can effectively overcome problems associated with error-prone and resource-intensive conventional techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
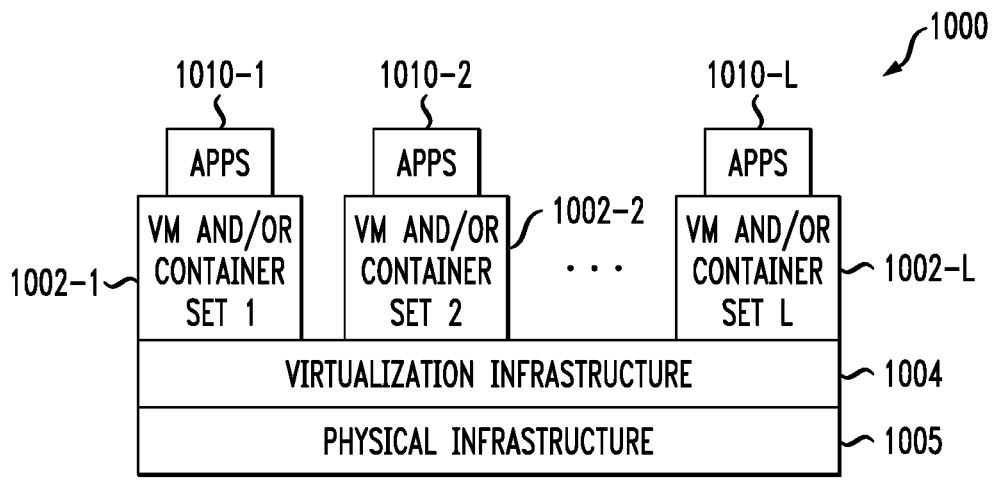
FIGS. 10 and 11 show examples of processing platforms that may be utilized to implement at least a portion of an information processing system in illustrative embodiments.
Figure 11:
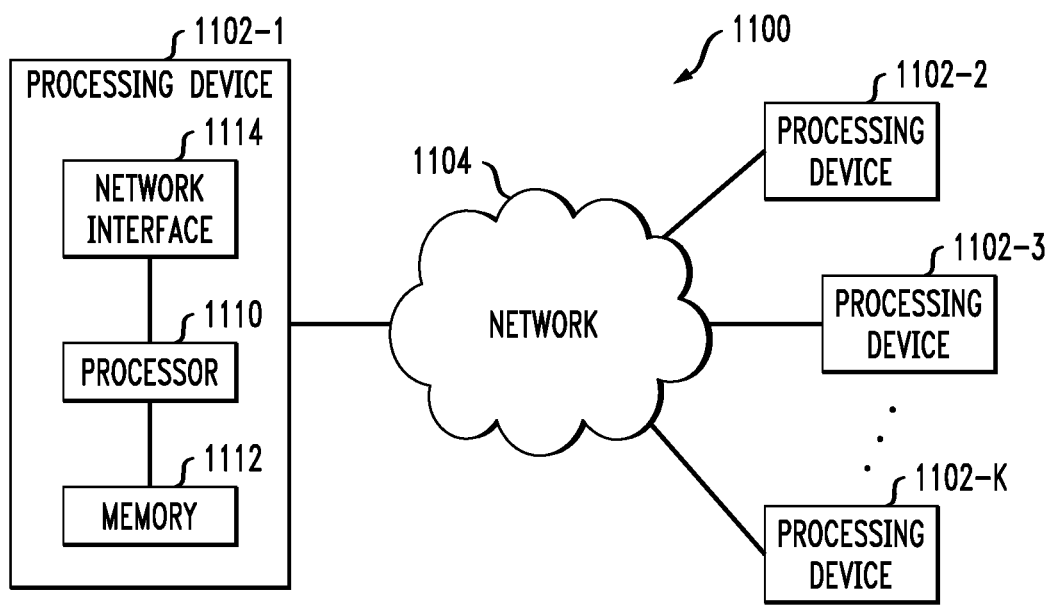

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more information processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a CPU, a GPU, a TPU, a microcontroller, an ASIC, a FPGA or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   identifying, from at least one set of unstructured documents comprising digital documents with varied layouts, one or more words and corresponding document position information by processing at least a portion of the at least one set of unstructured documents using one or more artificial intelligence-based text extraction techniques;
   generating an intermediate output by implementing character embeddings with respect to the at least one set of unstructured documents by processing at least a portion of the one or more identified words and corresponding document position information using at least one artificial intelligence-based encoder, wherein implementing the character embeddings comprises:
      implementing at least one textual embedding by processing the at least a portion of the one or more identified words and corresponding document position information using at least one integral transform in connection with multiple named-entity recognition prefix-based text labels; and
      implementing at least one visual embedding by processing the at least a portion of the one or more identified words and the corresponding document position information using one or more convolution layers with at least one dilation rate;
   determining structure-related information for at least a portion of the at least one set of unstructured documents by processing the intermediate output using one or more artificial intelligence-based graph-related techniques;
   generating a character-based representation of at least a portion of the at least one set of unstructured documents by processing at least a portion of the intermediate output in connection with the determined structure-related information using at least one artificial intelligence-based decoder;
   classifying one or more portions of the character-based representation using one or more artificial intelligence-based statistical modeling techniques; and
   performing one or more automated actions based at least in part on the classifying of the one or more portions of the character-based representation;
   wherein the method is performed by at least one processing device comprising a processor coupled to a memory.

2. The computer-implemented method of claim 1, wherein performing one or more automated actions comprises:
   generating one or more inferences based at least in part on the classifying; and
   extracting information from at least a portion of the at least one set of unstructured documents based at least in part on the one or more inferences.

3. The computer-implemented method of claim 1, wherein processing the intermediate output using one or more artificial intelligence-based graph-related techniques comprises learning, using a graph convolution layer, a two-dimensional layout of at least a portion of the at least one set of unstructured documents, and learning, using the graph convolution layer, information pertaining to how one or more words within at least a portion of the at least one set of unstructured documents relate to one or more other words within at least a portion of the at least one set of unstructured documents.

4. The computer-implemented method of claim 1, wherein processing the intermediate output using one or more artificial intelligence-based graph-related techniques comprises processing the intermediate output using one or more two-dimensional connection learning layers.

5. The computer-implemented method of claim 1, wherein implementing the at least one textual embedding comprises processing the at least a portion of the one or more identified words and corresponding document position information using at least one Fourier transform.

6. The computer-implemented method of claim 1, wherein generating a character-based representation comprises modifying one or more sequences within the intermediate output using at least one union layer of the at least one artificial intelligence-based decoder.

7. The computer-implemented method of claim 1, further comprising:
generating at least one hidden state for the one or more portions of the character-based representation by processing at least a portion of the character-based representation using at least one bidirectional long short-term memory model.

8. The computer-implemented method of claim 7, further comprising:
processing at least a portion of the generated hidden states using at least one conditional random field layer.

9. The computer-implemented method of claim 1, wherein processing at least a portion of the at least one set of unstructured documents using one or more artificial intelligence-based text extraction techniques comprises processing at least a portion of the at least one set of unstructured documents using at least one optical character recognition technique.

10. The computer-implemented method of claim 1, wherein identifying one or more words and corresponding document position information comprises identifying one or more words and coordinates of corresponding bounding boxes within the at least one set of unstructured documents.

11. The computer-implemented method of claim 1, wherein the at least one set of unstructured documents comprises one or more multi-lingual documents.

12. The computer-implemented method of claim 1, further comprising:
labeling at least a portion of the at least one set of unstructured documents;
generating one or more training datasets based at least in part on the at least one labeled portion of the unstructured documents; and
generating one or more validation datasets based at least in part on the at least one labeled portion of the unstructured documents.

13. A non-transitory processor-readable storage medium having stored therein program code of one or more software programs, wherein the program code when executed by at least one processing device causes the at least one processing device:
to identify, from at least one set of unstructured documents comprising digital documents with varied layouts, one or more words and corresponding document position information by processing at least a portion of the at least one set of unstructured documents using one or more artificial intelligence-based text extraction techniques;
to generate an intermediate output by implementing character embeddings with respect to the at least one set of unstructured documents by processing at least a portion of the one or more identified words and corresponding document position information using at least one artificial intelligence-based encoder, wherein implementing the character embeddings comprises:
implementing at least one textual embedding by processing the at least a portion of the one or more identified words and corresponding document position information using at least one integral transform in connection with multiple named-entity recognition prefix-based text labels; and
implementing at least one visual embedding by processing the at least a portion of the one or more identified words and the corresponding document position information using one or more convolution layers with at least one dilation rate;
to determine structure-related information for at least a portion of the at least one set of unstructured documents by processing the intermediate output using one or more artificial intelligence-based graph-related techniques;
to generate a character-based representation of at least a portion of the at least one set of unstructured documents by processing at least a portion of the intermediate output in connection with the determined structure-related information using at least one artificial intelligence-based decoder;
to classify one or more portions of the character-based representation using one or more artificial intelligence-based statistical modeling techniques; and
to perform one or more automated actions based at least in part on the classifying of the one or more portions of the character-based representation.

14. The non-transitory processor-readable storage medium of claim 13, wherein performing one or more automated actions comprises:
generating one or more inferences based at least in part on the classifying; and
extracting information from at least a portion of the at least one set of unstructured documents based at least in part on the one or more inferences.

15. The non-transitory processor-readable storage medium of claim 13, wherein processing the intermediate output using one or more artificial intelligence-based graph-related techniques comprises learning, using a graph convolution layer, a two-dimensional layout of at least a portion of the at least one set of unstructured documents, and learning, using the graph convolution layer, information pertaining to how one or more words within at least a portion of the at least one set of unstructured documents relate to one or more other words within at least a portion of the at least one set of unstructured documents.

16. An apparatus comprising:
at least one processing device comprising a processor coupled to a memory;
the at least one processing device being configured:
to identify, from at least one set of unstructured documents comprising digital documents with varied layouts, one or more words and corresponding document position information by processing at least a portion of the at least one set of unstructured documents using one or more artificial intelligence-based text extraction techniques;
to generate an intermediate output by implementing character embeddings with respect to the at least one set of unstructured documents by processing at least a portion of the one or more identified words and corresponding document position information using at least one artificial intelligence-based encoder, wherein implementing the character embeddings comprises:
implementing at least one textual embedding by processing the at least a portion of the one or more identified words and corresponding document position information using at least one integral transform in connection with multiple named-entity recognition prefix-based text labels; and implementing at least one visual embedding by processing the at least a portion of the one or more identified words and the corresponding document position information using one or more convolution layers with at least one dilation rate;
to determine structure-related information for at least a portion of the at least one set of unstructured documents by processing the intermediate output using one or more artificial intelligence-based graph-related techniques;
to generate a character-based representation of at least a portion of the at least one set of unstructured documents by processing at least a portion of the intermediate output in connection with the determined structure-related information using at least one artificial intelligence-based decoder;
to classify one or more portions of the character-based representation using one or more artificial intelligence-based statistical modeling techniques; and
to perform one or more automated actions based at least in part on the classifying of the one or more portions of the character-based representation.

17. The apparatus of claim 16, wherein performing one or more automated actions comprises:
generating one or more inferences based at least in part on the classifying; and
extracting information from at least a portion of the at least one set of unstructured documents based at least in part on the one or more inferences.

18. The apparatus of claim 16, wherein processing the intermediate output using one or more artificial intelligence-based graph-related techniques comprises learning, using a graph convolution layer, a two-dimensional layout of at least a portion of the at least one set of unstructured documents, and learning, using the graph convolution layer, information pertaining to how one or more words within at least a portion of the at least one set of unstructured documents relate to one or more other words within at least a portion of the at least one set of unstructured documents.

19. The apparatus of claim 16, wherein processing the intermediate output using one or more artificial intelligence-based graph-related techniques comprises processing the intermediate output using one or more two-dimensional connection learning layers.

20. The apparatus of claim 16, wherein implementing the at least one textual embedding comprises processing the at least a portion of the one or more identified words and corresponding document position information using at least one Fourier transform.

* * * * *